United States Patent
Gan-Levi et al.

(10) Patent No.: US 10,171,583 B2
(45) Date of Patent: Jan. 1, 2019

(54) DISTRIBUTED GLOBAL DATA VAULTING MECHANISM FOR GRID BASED STORAGE

(71) Applicant: International Business Machines Corporation, Armonk, NY (US)

(72) Inventors: Daniel Gan-Levi, Modiin (IL); Ehood Garmiza, Neve Ziv (IL); Michael Keller, Haifa (IL); Ofer Leneman, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/833,563

(22) Filed: Dec. 6, 2017

(65) Prior Publication Data

US 2018/0097878 A1   Apr. 5, 2018

Related U.S. Application Data

(63) Continuation of application No. 14/862,021, filed on Sep. 22, 2015, now Pat. No. 9,894,156.

(51) Int. Cl.
*H04L 29/08* (2006.01)

(52) U.S. Cl.
CPC ...... *H04L 67/1095* (2013.01); *H04L 67/2852* (2013.01)

(58) Field of Classification Search
None
See application file for complete search history.

(56) References Cited

U.S. PATENT DOCUMENTS

| 6,957,294 | B1 | 10/2005 | Saunders et al. | |
|---|---|---|---|---|
| 7,694,082 | B2 | 4/2010 | Golding et al. | |
| 9,229,870 | B1* | 1/2016 | Kumar | G06F 12/0868 |
| 9,652,343 | B2* | 5/2017 | Klughart | G06F 17/30203 |
| 2005/0177764 | A1* | 8/2005 | Cassell | G06F 11/0709 |
| | | | | 714/6.12 |
| 2005/0177770 | A1* | 8/2005 | Coatney | G06F 11/2092 |
| | | | | 714/15 |
| 2011/0029753 | A1* | 2/2011 | Baptist | G06F 11/1076 |
| | | | | 711/170 |
| 2011/0154133 | A1* | 6/2011 | Ganti | G06F 11/0712 |
| | | | | 714/54 |
| 2014/0304454 | A1 | 10/2014 | Ellis et al. | |
| 2014/0344504 | A1 | 11/2014 | Luo et al. | |
| 2016/0328296 | A1* | 11/2016 | Abhijeet | H04L 9/14 |

(Continued)

OTHER PUBLICATIONS

US Patent Application, dated Sep. 22, 2015, for U.S. Appl. No. 14/862,021, filed Sep. 22, 2015, invented by Daniel Gan-Levi et al., Total 26 pages.

(Continued)

*Primary Examiner* — Natisha D Cox
(74) *Attorney, Agent, or Firm* — Janaki K. Davda; Konrad, Raynes, Davda and Victor LLP (57) ABSTRACT

Provided are a computer program product, system, and method for distributed global data vaulting in a grid of server computers. At each of the server computers, it is determined that there is a system shutdown. For each data element at that server computer, a list of one or more vault devices at other server computers is retrieved from a vault distribution table, and the data element is dumped to the one or more vault devices at the other server computers.

12 Claims, 7 Drawing Sheets

(56) References Cited

U.S. PATENT DOCUMENTS

2016/0357624 A1* 12/2016 Hashimoto ......... G06F 11/0778
2017/0024295 A1   1/2017 Klughart
2017/0083395 A1   3/2017 Beard et al.

OTHER PUBLICATIONS

Office Action, dated Jun. 20, 2017, for U.S. Appl. No. 14/862,021, filed Sep. 22, 2015, invented by Daniel Gan-Levi et al., Total 13 pages.
Response to Office Action, dated Sep. 20, 2017, for U.S. Appl. No. 14/862,021, filed Sep. 22, 2015, invented by Daniel Gan-Levi et al., Total 8 pages.
Notice of Allowance, dated Oct. 5, 2017, for U.S. Appl. No. 14/862,021, filed Sep. 22, 2015, invented by Daniel Gan-Levi et al., Total 9 pages.
List of IBM Patents or Patent Applications Treated as Related, dated Dec. 6, 2017, pp. 2.

\* cited by examiner

| Data Element Identifier | Vault Device | Other Information |
|---|---|---|
| | 500 | |
| Data Element 1 at Server A | Vault Device 5 at Server B | |
| Data Element 1 at Server A | Vault Device 3 at Server C | |
| Data Element 1 at Server A | Vault Device 7 at Server D | |
| Data Element 1 at Server B | Vault Device 2 at Server A | |
| Data Element 1 at Server B | Vault Device 7 at Server C | |
| Data Element 1 at Server B | Vault Device 1 at Server D | |
| ⋮ | ⋮ | ⋮ |
| | | |

DISTRIBUTED GLOBAL DATA VAULTING MECHANISM FOR GRID BASED STORAGE

BACKGROUND OF THE INVENTION

1. Field of the Invention

Embodiments of the present invention relate to a computer program product, system, and method for a distributed global data vaulting mechanism for grid based storage.

2. Description of the Related Art

Grid (or "cluster") storage includes multiple server computers, and each of these server computers has cached data elements in Random Access Memory (RAM). The data elements in RAM are susceptible to data loss due to a sudden Alternating Current (AC) loss condition. That is, if AC is suddenly lost, the data elements in RAM may not be written to disk, and so, the data elements in RAM may be lost.

A common solution for an AC loss condition is to use some battery backup power to allow the dump of the data elements cached in RAM to stable storage (e.g., disk). A dump may be described as moving the data elements from RAM to stable storage. The stable storage may be referred to as a vault device. Typically, a server computer dumps the data elements from its RAM to its local disk.

For an enterprise system, both battery size and vault device capacity may rely on spare batteries and spare vault devices to sustain hardware failures. Both cases are expensive and consume valuable rack space.

SUMMARY

Provided are a computer program product, system, and method for distributed global data vaulting in a grid of server computers. At each of the server computers, it is determined that there is a system shutdown. For each data element at that server computer, a list of one or more vault devices at other server computers is retrieved from a vault distribution table, and the data element is dumped to the one or more vault devices at the other server computers.

DETAILED DESCRIPTION

Embodiments enable dumping uncommitted data during system shutdown (e.g., due to an AC loss condition) using a distributed global data vaulting mechanism for grid based storage. Such a dump may also be referred to as a fire hose dump.

Figure 1:
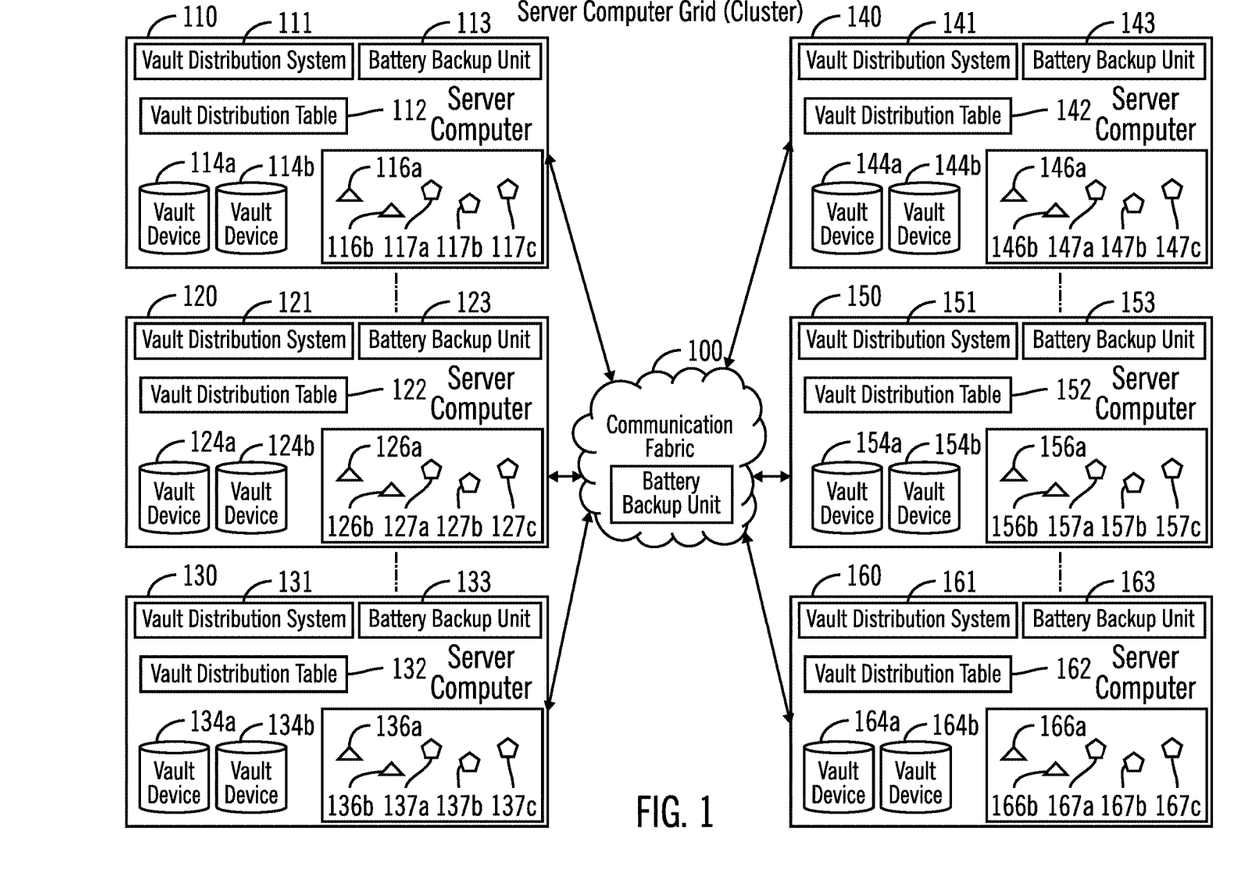
FIG. 1 illustrates, in a block diagram, of server computer grid in accordance with certain embodiments.

FIG. 1 illustrates, in a block diagram, of server computer grid in accordance with certain embodiments. The server computer grid includes a communication fabric 100 coupled to server computers 110, 120, 130, 140, 150, and 160. Each of the communication fabric 100 and the server computers 110, 120, 130, 140, 150, and 160 includes a battery backup unit. Each of the server computers 110, 120, 130, 140, 150, and 160 includes a vault distribution system 111, 121, 131, 141, 151, 161, respectively, for generating a vault distribution table 112, 122, 132, 142, 152, 162, respectively. In certain embodiments, one server computer is a central server computer, and the vault distribution system at the central server computer generates a vault distribution table. In certain embodiments, if the central server computer is not able to generate the vault distribution table, another server computer generates the vault distribution table.

In addition, each of the server computers 110, 120, 130, 140, 150, and 160 includes vault devices, vault-able data elements of type A, and vault-able data elements of type B. The data elements may be referred to as logical entities. "Vault-able" data elements may be described as ones that may be copied to vault devices using the vault distribution table during the vault process. In certain embodiments, the server computers 110, 120, 130, 140, 150, and 160 may include data elements that are not vault-able. In certain embodiments, there are types of data elements in addition to those of type A and type B. In certain embodiments, the data elements are stored in cache in Random Access Memory (RAM). In certain embodiments, the vault devices are Solid-State Disks (SSDs) or other stable storage.

In particular, server computer 110 includes vault devices 114a, 114b, vault-able data elements of type A 116a, 116b, and vault-able data elements of type B 117a, 117b, 117c. Server computer 120 includes vault devices 124a, 124b, vault-able data elements of type A 126a, 126b, and vault-able data elements of type B 127a, 127b, 127c. Server computer 130 includes vault devices 134a, 134b, vault-able data elements of type A 136a, 136b, and vault-able data elements of type B 137a, 137b, 137c. Server computer 140 includes vault devices 144a, 144b, vault-able data elements of type A 146a, 146b, and vault-able data elements of type B 147a, 147b, 147c. Server computer 150 includes vault devices 154a, 154b, vault-able data elements of type A 156a, 156b, and vault-able data elements of type B 157a, 157b, 157c. Server computer 160 includes vault devices 164a, 164b, vault-able data elements of type A 166a, 166b, and vault-able data elements of type B 167a, 167b, 167c.

In certain embodiments, one or more of the server computers 110, 120, 130, 140, 150, and 160 are "master" or "primary" server computers that maintain original data elements, while the remaining server computers 110, 120, 130, 140, 150, and 160 are "backup" or "secondary" server computers that maintain copies of the data elements (e.g., in case of failure of the master or primary server computers). In certain embodiments, the communications fabric 100 is an InfiniBand® fabric. (InfiniBand is a registered trademark of the InfiniBand Trade Association in the United States and/or other countries.)

Figure 2:
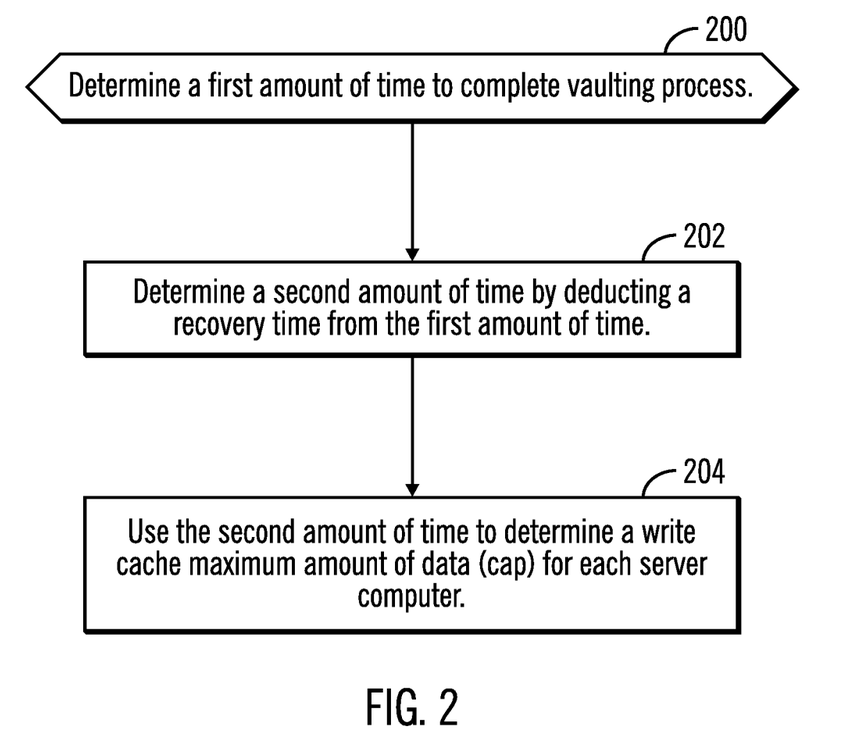
FIG. 2 illustrates, in a flow diagram, operations for determining a maximum write cache amount of data to be transferred during a vault process in accordance with certain embodiments.

FIG. 2 illustrates, in a flow diagram, operations for determining a maximum write cache amount of data to be transferred during a vault process in accordance with certain embodiments. In block 200, the vault distribution system determines a first amount of time to complete the vaulting process. In particular, the vault distribution system determines a bandwidth available for each server computer to transfer data to a vault device. In certain embodiments, the bandwidth is the same for one or more of the server computers. The bandwidth is used to determine the duration needed for the vaulting process to complete (i.e., the battery capacity needed to sustain the vaulting process).

In block 202, the vault distribution system determines a second time by deducting a recovery time from the first amount of time. That is, the vault distribution system takes into consideration the capacity to contain the dump with sufficient resiliency to medium errors or SSD hardware errors. For example, an error may occur that requires the dump to re-start, and this is taken into account as recovery time that is deducted from the amount of time for the vault to complete.

In block 204, the vault distribution system uses the second amount of time to determine a write cache maximum amount of data (cap) for each server computer.

Figure 3:
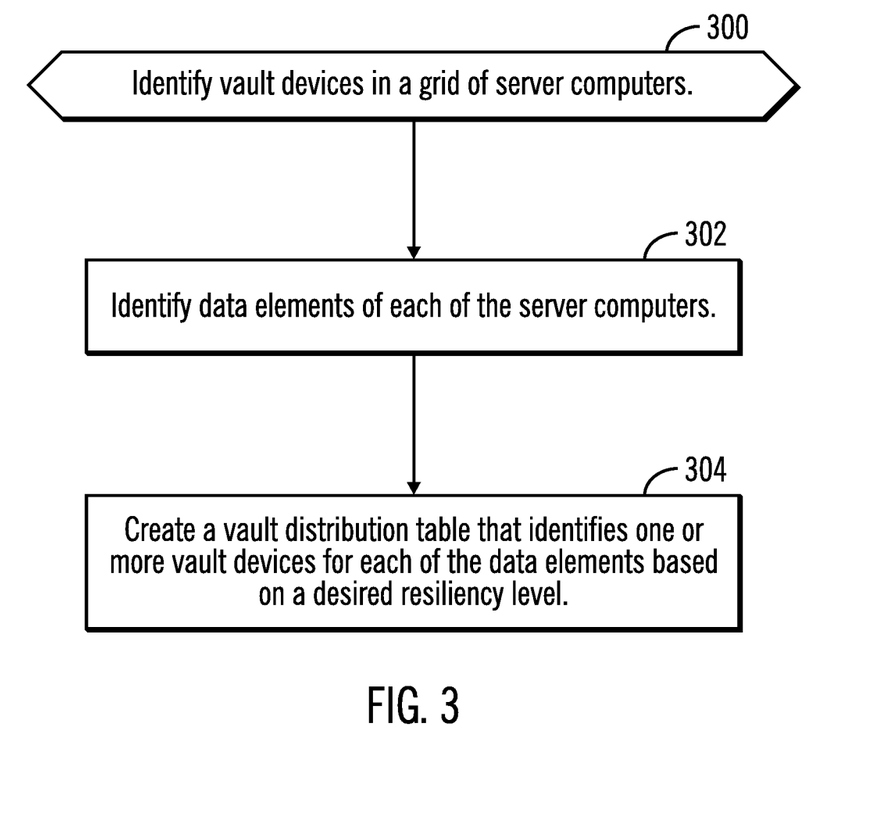
FIG. 3 illustrates, in a flow diagram, operations for creating a vault distribution table in accordance with certain embodiments.

FIG. 3 illustrates, in a flow diagram, operations for creating a vault distribution table in accordance with certain embodiments. In block 300, the vault distribution system identifies vault devices in a grid of server computers. In certain embodiments, the vault distribution table is discarded after every successful boot to online state. In block 302, the vault distribution system identifies data elements of each of the server computers. The data elements include data elements in write caches, partition metadata, etc. In block 304, the vault distribution system creates a vault distribution table that identifies one or more vault devices for each of the data elements based on a desired resiliency level. A desired resilience level may be described as a resiliency to medium errors or SSD hardware errors. For example, data elements may be backed up multiple times across multiple SSDs to limit/avoid corruption or loss. In certain embodiments, the vault distribution table identifies at least three vault devices for each of the data elements. In certain embodiments, the vault devices are assigned to each of the data elements with the following priorities:

priority 1: each of multiple vault devices assigned to a data element is at a different server computer;

priority 2: if there are not enough vault devices to meet priority 1 (i.e., to assign multiple vault devices at different server computers), each vault device is a different vault device, even if multiple vault devices are at the same server computer; and priority 3: if there are not enough vault devices to meet priority 2, there may be fewer vault devices assigned to the data element.

Figure 4:
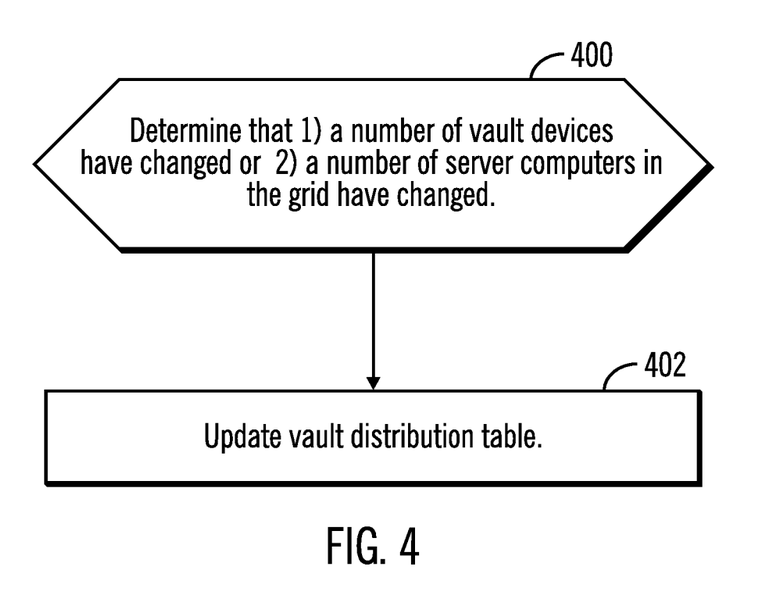
FIG. 4 illustrates, in a flow diagram, operations for updating a vault distribution table in accordance with certain embodiments.

FIG. 4 illustrates, in a flow diagram, operations for updating the vault distribution table in accordance with certain embodiments. In block 400, the vault distribution system determines that 1) a number of vault devices have changed or 2) a number of server computers in the grid have changed. In block 402, the vault distribution system updates the vault distribution table.

In certain embodiments, the vault process cannot complete properly as an outcome of a new distribution table. For example, this may be based on the number of vault devices remaining to serve the next vault process in terms of bandwidth and capacity, which is calculated with the new vault distribution table. For example, a certain vault device may need to ingest X Gigabytes (GB) of data, and that will take more time than is available in the battery backup unit. In such embodiments, the vault distribution table may be updated to allow the vault process to complete properly.

Figure 5:
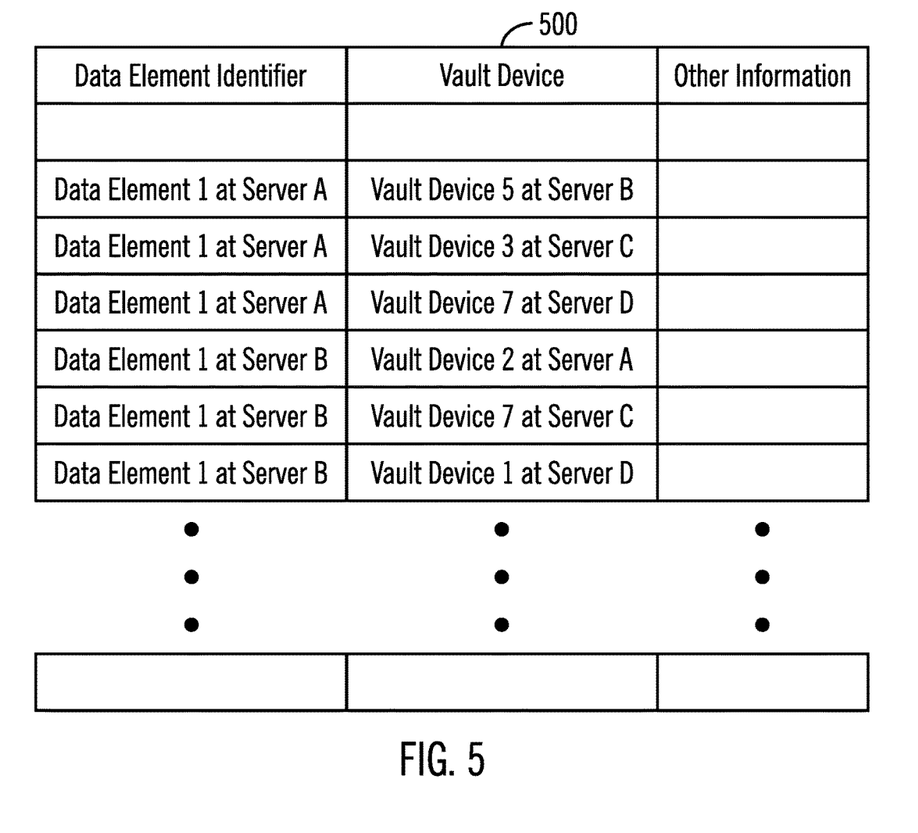
FIG. 5 illustrates an example vault distribution table in accordance with certain embodiments.

FIG. 5 illustrates an example vault distribution table 500 in accordance with certain embodiments. In vault distribution table 500, a first column provides a data element identifier, a second column provides a vault device, and a third column provides additional information. In certain embodiments, a data element for a particular server computer is not assigned a vault device at that server computer. In certain embodiments, the vault distribution table 500 is in a central location that is accessed by the server computers in the grid. The ellipses in FIG. 5 indicated that there may be more rows to the table for additional data elements.

Figure 6:
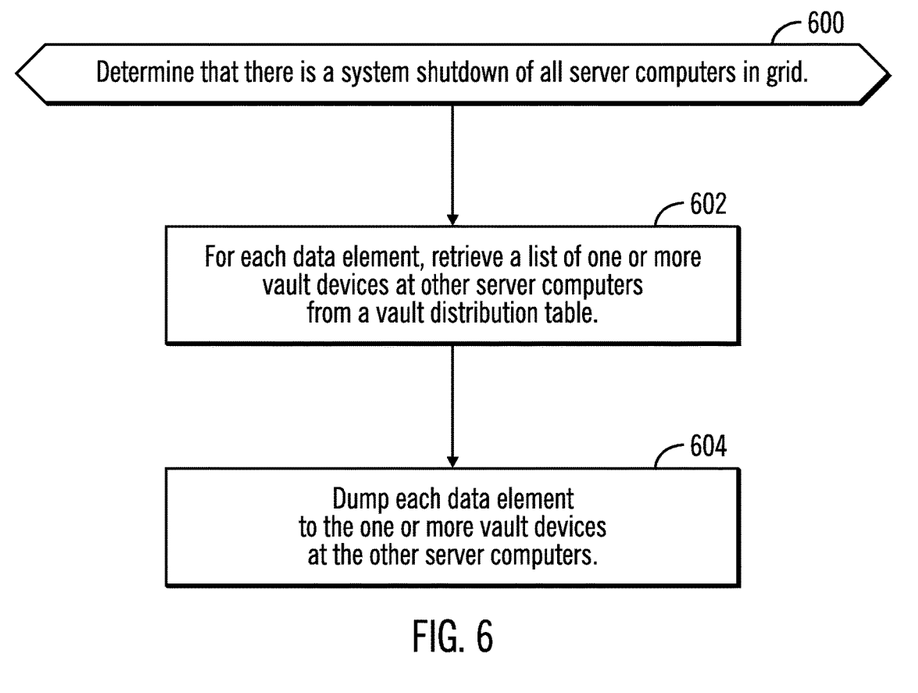
FIG. 6 illustrates, in a flow diagram, operations performed by each server computer in a grid of server computers in accordance with certain embodiments.

FIG. 6 illustrates, in a flow diagram, operations performed by each server computer in a grid of server computers in accordance with certain embodiments. Control begins at block 600 with each server computer determining that there is a system shutdown of all of the server computers in the grid. In certain embodiments, a management server computer notifies the other server computers that there is a system shutdown. In certain embodiments, each server computer includes a process that handles processing when a system shutdown is occurring. In block 602, each server computer retrieves, for each data element at that server computer, a list of one or more vault devices at other server computers from a vault distribution table. In block 604, each server computer dumps data elements to the one or more vault devices.

Thus, embodiments provide a global distributed pool of vaulting devices. This minimizes vault time increase and maintains data element resiliency when vault devices fail in the grid. This also requires less capacity spares in the grid. In the conventional case, in which the server computer is limited to local vault devices, losing 1 out of 2 vault devices in a single server computer means 100% increase of vault time for the server computer. With embodiments, the distributed global vaulting scheme results in an increase in vault processing time by a fraction of the actual resource (vault device and/or server computer) lost.

The vault distribution system builds on a fast and reliable switched data network with backup power between server computers in the grid. The vault distribution table assigns for each data element a vault address space in any vault device across the grid. With embodiments, there is no limitation of the server computer to dump data on its local device.

The vault distribution may include more than one vault destination per data element across multiple failure domains, server computers, to allow for increased resiliency to hardware failures.

The vault distribution system provides the least vault time increase in case of vault device failure by recalculating the vault distribution to load balance activity across all remaining vault devices.

In addition, the capability to add more copies of the data elements in other failure domains dramatically increases the resiliency of the system by significantly reducing the risk of losing all vault devices in one server computer to cause data loss.

The outcome is that for a given grid size and resiliency requirements, embodiments reduce the spare hardware parts to gain the same overall vaulting attributes (e.g., vault size and time available for the vault process).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as a, b, c, used to designate a number of instances of an element may indicate a variable number of instances of that element when used with the same or different elements.

Figure 7:
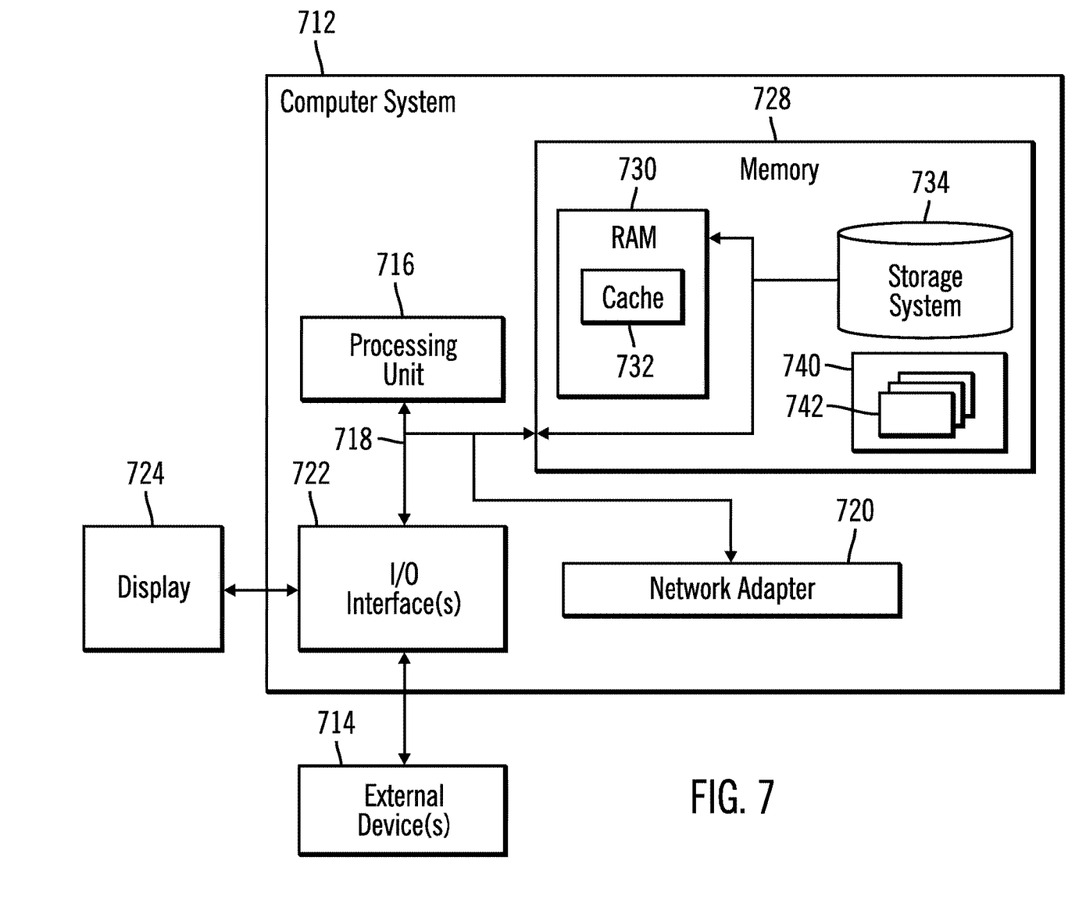
FIG. 7 illustrates a computing environment in which components of FIG. 1 may be implemented in accordance with certain embodiments.

The server computers 110, 120, 130, 140, 150, and 160 of FIG. 1 may each be implemented in a computer system, such as the computer system 712 shown in FIG. 7. Computer system 712 may be described in the general context of computer system executable instructions, such as program modules, being executed by a computer system. Generally, program modules may include routines, programs, objects, components, logic, data structures, and so on that perform particular tasks or implement particular abstract data types. Computer system 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system 712 is shown in the form of a general-purpose computing device. The components of computer system 712 may include, but are not limited to, one or more processors or processing units 716, a system memory 728, and a bus 718 that couples various system components including system memory 728 to one or more processors or processing units 716. Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 712 typically includes a variety of computer system readable media. Such media may be any available media that is accessible by computer system 712, and it includes both volatile and non-volatile media, removable and non-removable media.

System memory 728 can include computer system readable media in the form of volatile memory, such as random access memory (RAM) 730, which includes cache memory 732. Computer system 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. The components of the computer system 712 may be implemented as program modules 742 which generally carry out the functions and/or methodologies of embodiments of the invention as described herein.

Computer system 712 may also communicate with one or more external devices 714 such as a keyboard, a pointing device, a display 724, etc.; one or more devices that enable a user to interact with computer system 712; and/or any devices (e.g., network card, modem, etc.) that enable computer system 712 to communicate with one or more other computing devices. Such communication can occur via Input/Output (I/O) interfaces 722. Still yet, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components may be used in conjunction with computer system 712. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for distributed global data vaulting in a grid of server computers, the computer program product comprising a computer readable storage medium having computer readable program code embodied therein that executes to perform operations, the operations comprising:
- at one of the server computers of the grid of server computers,
  - assigning a plurality of vault devices for each data element of a plurality of data elements based on a resiliency level,
    - wherein, for a first priority, each of the plurality of vault devices assigned to a data element is at a different server computer of the grid of server computers; and
    - wherein, for a second priority, in response to determining that there are not enough vault devices to assign each of the plurality of vault devices at a different server computer, at least two of the plurality of vault devices is a different vault device of a same server computer of the grid of server computers; and
  - creating a vault distribution table that identifies the plurality of vault devices for each data element; and
- at each of the server computers of the grid of server computers,
  - determining that there is a system shutdown; and
  - for each data element at that server computer,
    - retrieving a list of one or more vault devices at other server computers from the vault distribution table; and
    - dumping the data element to the one or more vault devices at the other server computers.

2. The computer program product of claim 1, wherein the operations further comprise:
- determining a first amount of time to complete a vaulting process;
- determining a second amount of time by deducting a recovery time from the first amount of time; and
- using the second amount of time to determine a write cache maximum amount of data for each of the server computers.

3. The computer program product of claim 1, wherein the operations further comprise:
- identifying the vault devices in the grid of server computers; and
- identifying each data element of each of the server computers.

4. The computer program product of claim 1, wherein the operations further comprise:
- in response to determining at least one of: 1) a number of vault devices have changed, and 2) a number of server computers in the grid have changed, updating the vault distribution table.

5. A system for distributed global data vaulting, comprising: a grid of server computers, wherein each of the server computers includes a processor and a computer readable storage medium having program code; and
- wherein, one of the server computers of the grid of server computers executes the program code to perform operations, the operations comprising,
  - assigning a plurality of vault devices for each data element of a plurality of data elements based on a resiliency level,
    - wherein, for a first priority, each of the plurality of vault devices assigned to a data element is at a different server computer of the grid of server computers; and
    - wherein, for a second priority, in response to determining that there are not enough vault devices to assign each of the plurality of vault devices at a different server computer, at least two of the plurality of vault devices is a different vault device of a same server computer of the grid of server computers; and
  - creating a vault distribution table that identifies the plurality of vault devices for each data element; and
- wherein each of the server computers of the grid of server computers executes the program code to perform operations, the operations comprising:
  - determining that there is a system shutdown; and
  - for each data element at that server computer,
    - retrieving a list of one or more vault devices at other server computers from vault distribution table; and
    - dumping the data element to the one or more vault devices at the other server computers.

6. The system of claim 5, wherein the computer readable program code executes to perform operations, the operations comprising:
- determining a first amount of time to complete a vaulting process;
- determining a second amount of time by deducting a recovery time from the first amount of time; and
- using the second amount of time to determine a write cache maximum amount of data for each of the server computers.

7. The system of claim 5, wherein the operations further comprise:
- identifying the vault devices in the grid of server computers; and
- identifying each data element of each of the server computers.

8. The system of claim 5, wherein the operations further comprise:
- in response to determining at least one of: 1) a number of vault devices have changed, and 2) a number of server computers in the grid have changed, updating the vault distribution table.

9. A method for distributed global data vaulting in a grid of server computers, comprising:
- at one of the server computers of the grid of server computers,
  - assigning a plurality of vault devices for each data element of a plurality of data elements based on a resiliency level,
    - wherein, for a first priority, each of the plurality of vault devices assigned to a data element is at a different server computer of the grid of server computers; and
    - wherein, for a second priority, in response to determining that there are not enough vault devices to assign each of the plurality of vault devices at a different server computer, at least two of the plurality of vault devices is a different vault device of a same server computer of the grid of server computers; and
  - creating a vault distribution table that identifies the plurality of vault devices for each data element; and
- at each of the server computers of the grid of server computers,
  - determining that there is a system shutdown; and
  - for each data element at that server computer,
    - retrieving a list of one or more vault devices at other server computers from the vault distribution table; and dumping the data element to the one or more vault devices at the other server computers.

10. The method of claim 9, further comprising:

determining a first amount of time to complete a vaulting process;

determining a second amount of time by deducting a recovery time from the first amount of time; and using the second amount of time to determine a write cache maximum amount of data for each of the server computers.

11. The method of claim 9, further comprising:

identifying the vault devices in the grid of server computers; and identifying each data element of each of the server computers.

12. The method of claim 9, further comprising:

in response to determining at least one of: 1) a number of vault devices have changed, and 2) a number of server computers in the grid have changed, updating the vault distribution table.

* * * * *